Dec. 26, 1961  F. B. STENCEL  3,014,678
PARACHUTE APPARATUS
Filed Nov. 13, 1958  4 Sheets-Sheet 1
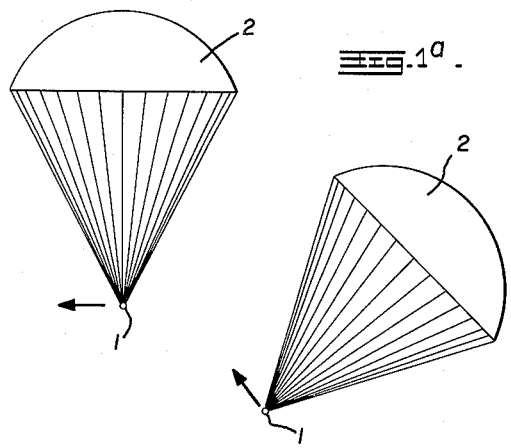
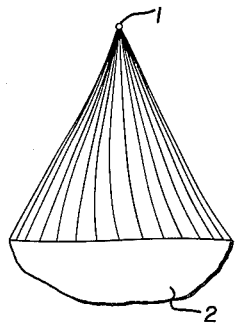
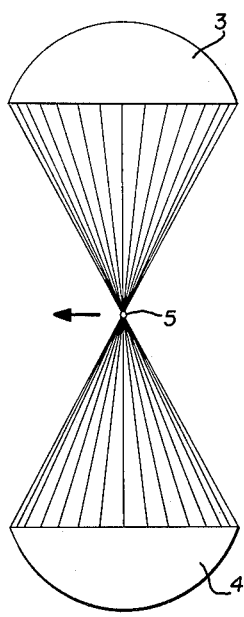
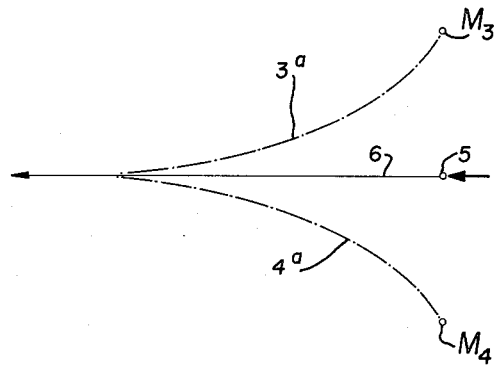
INVENTOR.
FRED B. STENCEL
BY
ATTORNEY Dec. 26, 1961   F. B. STENCEL   3,014,678
PARACHUTE APPARATUS
Filed Nov. 13, 1958   4 Sheets-Sheet 2
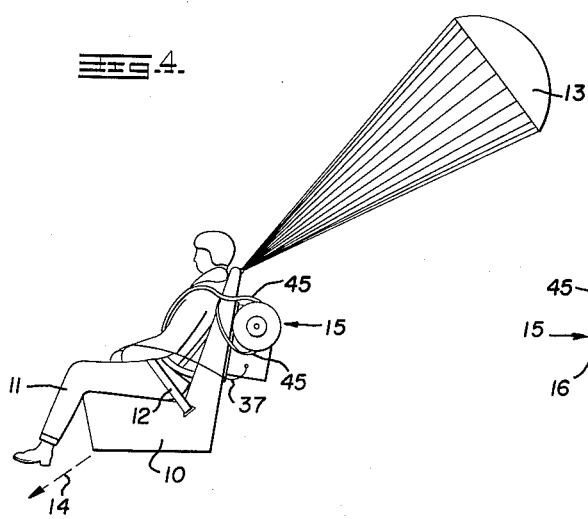
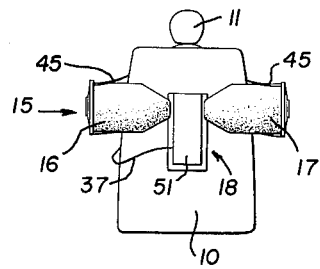
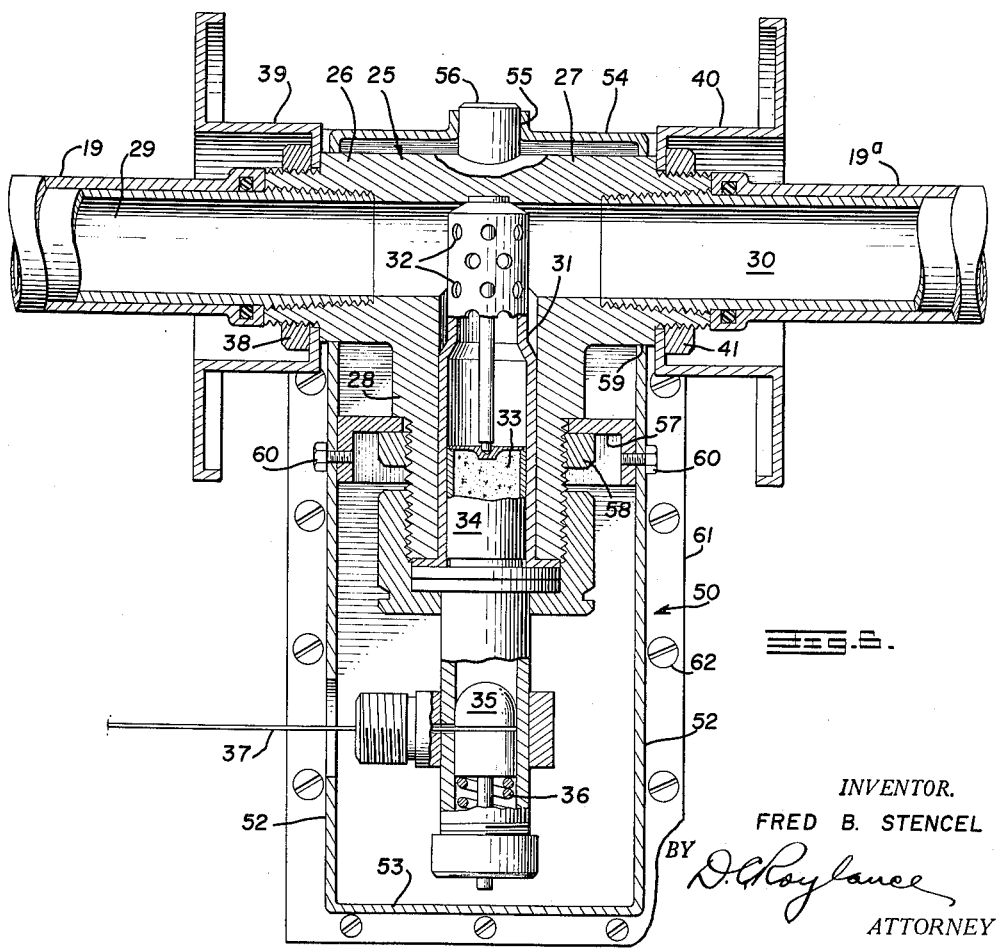
INVENTOR.
FRED B. STENCEL
BY D. G. Roylance
ATTORNEY

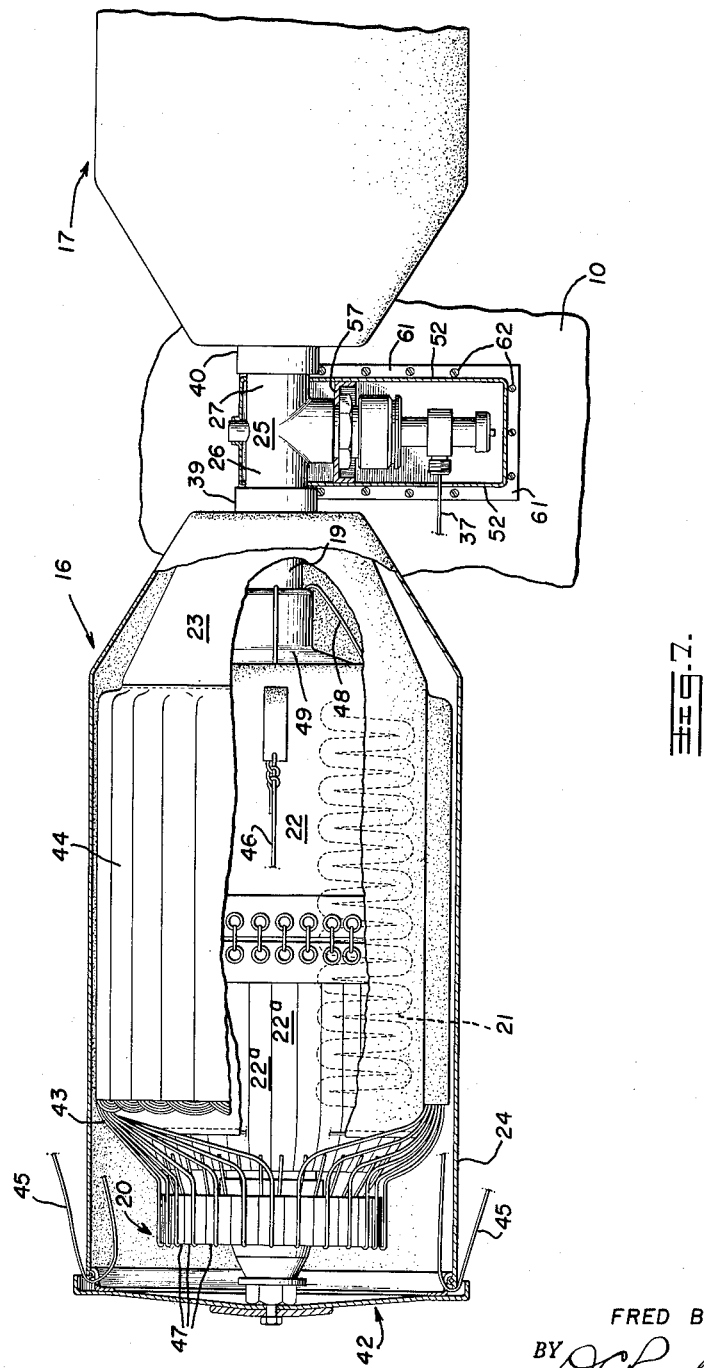

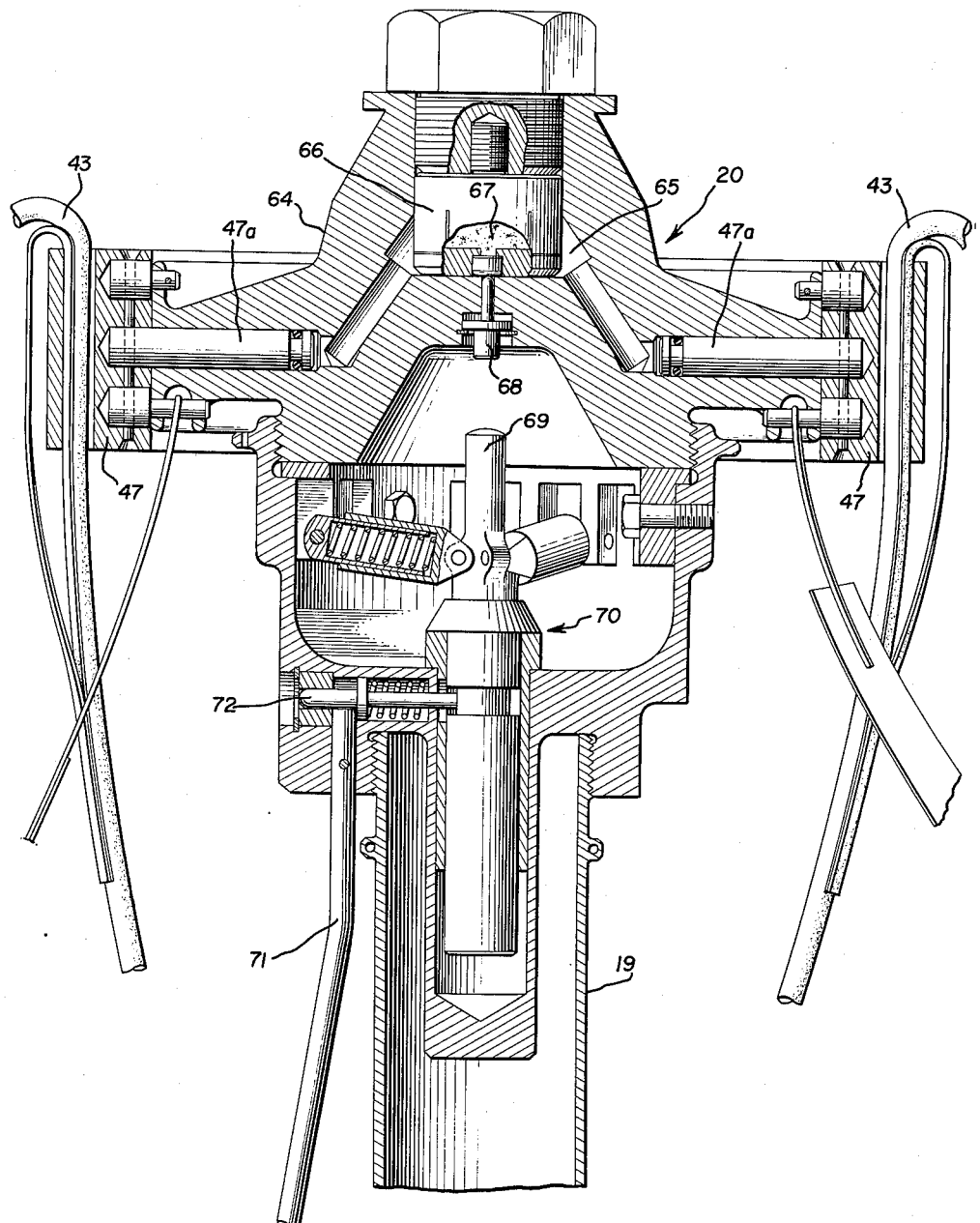

United States Patent Office 3,014,678
Patented Dec. 26, 1961

3,014,678
PARACHUTE APPARATUS
Fred B. Stencel, Asheville, N.C., assignor to Stencel Aero Engineering Corporation, Asheville, N.C., a corporation of North Carolina
Filed Nov. 13, 1958, Ser. No. 773,598
5 Claims. (Cl. 244—147)

This invention relates to parachute apparatus and particularly to improvements in parachute apparatus of the power-projected, power-deployed type disclosed in my copending application Serial No. 581,535, filed April 30, 1956, now abandoned.

Power-actuated parachute apparatus of the type disclosed in said copending application is of such nature that projection of the parachute canopy from the load to be recovered, and deployment of the canopy toward the end of the projection flight, occur very quickly, the projection and deployment actions being so fast as to be almost instantaneous. No unusual difficulties arise when such a parachute apparatus is employed to recover a stationary load or a load travelling at low speed. However, I have found that distinct difficulties are encountered when it is necessary to recover, with such a fast-acting parachute apparatus, a load which is travelling at a relatively high speed.

Thus, if a parachute of the type disclosed in the aforementioned copending application is employed in an attempt to recover the pilot from an ejection seat ejected from a conventional aircraft travelling in excess of, say, 130 miles an hour, there is a severe "pendulum effect," causing the load to pivot rather violently about a point located at the deployed parachute canopy.

It is accordingly an object of the present invention to provide an improved power-actuated parachute apparatus by means of which a load travelling at a substantial speed can be successfully recovered.

Another object of the invention is to provide a power-projected and power-deployed parachute apparatus capable of use in situations where the load to be recovered is travelling at a substantial speed and effective to materially reduce the shock occurring as a result of sudden deployment of the canopy.

A further object is to devise a novel and particularly effective power-actuated, multi-canopy parachute apparatus.

Yet another object is to devise a parachute apparatus capable of successful use both at low, or zero, speeds and in situations where the load to be recovered is travelling at a relatively high speed.

In order that the manner in which these and other objects are achieved in accordance with the invention can be readily understood, reference is had to the accompanying drawings, which form a part of this specification, and wherein:

FIGS. 1–1b are sequential diagrammatic illustrations of one phenomenon which may occur when employing a single, power-projected, power-deployed parachute to recover a load travelling at a substantial rate of speed;

FIG. 2 is a diagrammatic illustration of the manner in which the parachute apparatus of the present invention employs two oppositely projected parachute canopies;

FIG. 3 is a diagram illustrating the manner in which the two parachute canopies, and the air masses therein, are accelerated when a parachute apparatus in accordance with the present invention is employed to recover a load travelling at a relatively high speed;

FIG. 4 is a side elevational view of one embodiment of the invention applied to an aircraft ejection seat;

FIG. 5 is a rear elevational view of the device of FIG. 4;

FIG. 6 is a sectional view, taken vertically as the apparatus is viewed in FIG. 5, of the projection means employed in this embodiment of the invention, some parts being shown in elevation, FIG. 7 is a view, partly in elevation and partly in vertical section, with some parts broken away for clarity, of the parachute apparatus of FIGS. 4 and 5, and FIG. 8 is a longitudinal sectional view, on an enlarged scale, of the deployment means employed in the apparatus of FIG. 7, showing the same in unactuated condition.

Referring now to the drawings in detail, FIGS. 1–1b illustrate successive attitudes which I have found may be assumed by the parachute canopy and the load when a single-canopy parachute apparatus of the type disclosed in the aforementioned copending application, Serial No. 581,535, is employed in an attempt to recover a load travelling at a relatively high speed, when the direction of projection is transverse to the direction of travel of the load. In these figures, the load, such as the pilot of a conventional aircraft, is indicated at 1 and the parachute canopy is indicated at 2, the load of course being connected to the canopy by suspension lines in the usual fashion. FIG. 1 illustrates the positions of the canopy and the load at the instant of full deployment of the parachute canopy 2 after the canopy has been projected. As will be readily understood from the aforementioned copending application, both projection and deployment are accomplished at very high rates by means of explosively powered projection and deployment devices, so that the canopy is fully inflated while still in a crosswise position relative to the path of movement of the load.

At the instant when full deployment of the parachute canopy 2 has been accomplished, the canopy of course embraces a substantial mass of air and it may be said that the canopy and the air embraced thereby represent an apparent mass $M_1$. The mass $M_2$ of the load 1 is moving, in the direction of flight of the aircraft, at a rate which is great as compared to the movement, if any, of mass $M_1$. Hence, as seen in FIG. 1a, the load 1 begins to move in a circular path about a point at the canopy. Assuming that the aircraft is travelling in a horizontal direction, the load will rotate forwardly and upwardly, as indicated by the arrow in FIG. 1a. If the speed of the aircraft at the time of projection of the parachute is on the order of 120–150 miles per hour, the load 1 may actually move to a position above the canopy 2, and, since the suspension lines are taut, the canopy will then be inverted. I have actually observed cases in which the load 1 was decelerated to substantially zero speed in a position above the canopy, as indicated in FIG. 1b, with the result that the load tends to fall into the inverted canopy and the effectiveness of the parachute as a recovery device is of course completely destroyed.

From the foregoing discussion with reference to FIGS. 1–1b, it will be obvious that the "pendulum effect" illustrated will cause highly undesirable results whenever a single parachute canopy is projected abruptly along a line transverse to the direction of travel of the load and the canopy is then abruptly deployed, assuming that the load is travelling at a substantial rate of speed.

I have found that these disadvantages can be successfully overcome by employing a pair of parachute canopies in combination with apparatus effective to project the two canopies simultaneously in opposite directions along a line transverse to the direction of travel of the load. As will be clear from FIG. 2, I employ a first parachute canopy 3 projected from the load in one direction transversely of the direction of travel of the load and a parachute canopy 4 projected simultaneously in the opposite direction. As will be clear from the detailed description of FIGS. 4–5 appearing hereinafter, I employ in combination with the two canopies explosively powered apparatus effective to project the canopies to the positions illustrated in FIG. 2 in the very short time period, on the order of 0.3—0.4 second, for example, and to then deploy the two canopies substantially simultaneously, with the deployment time being as short as 0.2 second, for example. Hence, it can be said that, for practical purposes, the canopies 3 and 4 and the load 5 occupy the relative positions seen in FIG. 2 substantially instantaneously after the device has been actuated.

Since the load 5 has, at the time of deployment of the canopies 3 and 4, substantially the same forward speed exhibited by the aircraft at the time of actuation of the parachute apparatus, it will be obvious that the load is moving relatively rapidly along the line illustrated at 6 in FIG. 3. Such movement of the load 5 tends to accelerate the canopies 3 and 4, and the air masses embraced thereby, along the lines $3^a$ and $4^a$, respectively, in the manner which will be evident from FIG. 3. Thus considering that the canopy 3 and the air embraced thereby constitute an apparent mass $M_3$ and the canopy 4 and the air embraced thereby constitute an apparent mass $M_4$, the masses $M_3$ and $M_4$ will at first begin to accelerate toward each other as the load 5 proceeds in its direction of travel. The masses $M_3$ and $M_4$ then continue to accelerate, following the curves $3^a$ and $4^a$, respectively, as the load is decelerated.

Viewing FIG. 3, it will be obvious that the masses $M_3$, $M_4$, because of their initial disposition at the time the canopies are deployed, and because of the fact that the suspension lines for the two canopies are of equal lengths, apply decelerating forces to the load 5 which ar equal and which always deviate from the line of travel 6 by equal and opposite angles. Hence, the total effect of the parachute canopies on load 5 is to decelerate the load without causing the same to depart materially from the line of travel 6.

It will thus be understood that use of the two oppositely projected and simultaneously deployed parachute canopies in the manner just described not only completely avoids the disadvantageous "pendulum effect" illustrated in FIGS. 1–1b but also assures decleration of the load 5 in such fashion as to minimize shock at the time the parachute apparatus is actuated. Furthermore, because of the cubic relation of volume to radius and the quadratic relation of drag to radius, the total apparent mass when the two canopies 3, 4 are employed is less than the apparent mass when one equally effective canopy is used.

One particularly advantageous embodiment of the invention will now be described in detail with reference to FIGS. 4–7 of the application. As seen in FIG. 4, the parachute apparatus is applied to a conventional ejection seat 10 in which the aircraft pilot 11 is held by means of the usual safety belt 12. The ejection seat 10 is equipped with a conventional stabilizing parachute, illustrated in open position at 13, to stabilize the seat with respect to the direction of travel of the aircraft at the time of ejection, as is well known in the art. Thus, after stabilizing parachute 13 has opened, the pilot will be facing in the general direction of travel of the aircraft from which he was ejected and the ejection seat will be moving in a direction such as that indicated by the arrow at 14.

The parachute system 15 of this embodiment of the invention includes a pair of identical canopy assemblies 16, 17 associated with a single explosively operated projection means disposed between the two canopy assemblies and enclosed within housing 18 which, as will be evident from FIG. 5, is employed to mount the parachute system 15 on the ejection seat. The two canopy assemblies 16, 17 are identical but are disposed in opposition and, advantageously, centered upon a common axis extending transversely of the direction of movement of the ejection seat determined by the stabilizing parachute 13.

Each canopy assembly comprises a projectile tube 19, an explosively operated deployment device mounted on and closing the leading end of the projectile tube and indicated generally at 20, FIG. 7 and shown in detail in FIG. 8, a specially folded parachute canopy illustrated by the dotted lines at 21, canopy retaining bag 22, a pocketed suspension line sleeve 23 and an outer container or bag 24. The canopy assemblies 16, 17 are constructed in accordance with my copending application Serial No. 718,362, filed February 28, 1958, now Patent No. 2,957,664.

As seen in FIG. 6, the projection means includes a casing member 25 of cast aluminum or the like, the casing member being of generally T-shaped configuration so as to present two coaxially aligned tubular arms 26 and 27 and a third tubular arm 28 extending at right angles thereto. A projection tube 29 is threaded into or otherwise rigidly secured to arm 26 in communication with the interior of member 25 and a second projection tube 30 is similarly associated with arm 27, the two projection tubes being disposed coaxially and each extending for a major portion of the length of the corresponding canopy assembly 16, 17. The projectile tube 19 of canopy assembly 16 is telescopically engaged over projection tube 29 while the projectile tube $19^a$ of canopy assembly 17 is telescopically engaged over projection tube 30.

The interior of arm 28 of casing member 25 communicates directly with the junction between the tubular bores of arms 26 and 27 and hence with the projection tubes. Disposed within arm 28 is a combustion chamber member 31 of tubular form and provided with perforations 32. A projection charge 33, contained within a charge container 34, is disposed within the outer end of the combustion chamber member 31 and is provided with the usual explosive primer (not shown) operatively associated with a spring actuated firing pin 35. Firing pin 35 is urged toward the primer and projection charge by means of a compressed spring 36, but is normally held from action by means of an actuating wire 37 manipulated manually by the pilot 11. Combustion chamber member 31, the projection charge 33 and its container 34, and the firing pin 35 and its associated operating mechanism are all constructed in accordance with my copending application Serial No. 718,364, filed February 28, 1958, now Patent No. 2,965,337.

In operation, manual withdrawal of control wire 37 allows spring 36 to snap firing pin 35 into contact with the primer, so causing the same to explode the projection charge 33. The expanding gases resulting from the explosion escape, via perforations 32, equally into the interiors of projection tubes 29 and 30. Projectile tubes 19 and $19^a$ of canopy assemblies 16 and 17, respectively, are accordingly projected simultaneously in opposite directions along the common axis for the two projection tubes.

Secured to arm 26 of casing member 25, as by nut 33, FIG. 6, is an annular retaining plate 39. A similar retaining plate 40 is secured, as by nut 41, at the end of arm 27 of casing member 25. Each of the two retaining plates is associated with a different one of the canopy assemblies 16, 17. Thus, the retaining plate 39 serves to secure the inner ends of outer bag 24 and suspension line sleeve 23 of canopy assembly 16, while plate 40 serves the same purpose with respect to assembly 17. As the assembly 16 travels away from the projection means, the bag 24 and sleeve 23, being held on plate 39, as by suitable drawstrings, remain stationary. End cover cap assembly 42 is stripped from the outer end of bag 24. The suspension lines 43, FIG. 7, pay out progressively from pockets 44 of sleeve 23.

The ends of the suspension lines most distant from the parachute canopy are attached to extension straps 45 which project outside of outer bag 24 and, as seen in FIG. 4, are attached to the usual harness worn by the pilot. Each assembly 16 is also provided with plurality of arresting lines, indicated at 46 in FIG. 7, one end of each arresting line being attached to the canopy bag 22 and the other end being attached to strap 45. The arresting lines are materially shorter than the suspension lines and therefore become taut, during projection of the canopy, while the suspension lines are relatively slack. This action of the arresting lines serves to rapidly decelerate the canopy assembly.

The explosively operated deployment means 20 is constructed in accordance with my copending application Serial No. 718,363, filed February 28, 1958, now Patent No. 2,953,333. As shown in FIGS. 7 and 8, deployment means 20 includes casing means 64 secured to the outer end of projectile tube 19 and defining an explosion chamber 65 in which is disposed a deformable charge container 66 enclosing a deployment powder charge 67. The powder charge 67 is arranged to be ignited by a primer 68, the primer being ignited when struck by the firing pin 69 of an inertia operated firing device indicated generally by reference numeral 70. Prior to projection of the canopy assembly, firing pin 69 is spring biased to the position shown in FIG. 8 and is latched in that position by a latch rod 71 and latch pin 72. Upon projection of the canopy assembly, latch rod 71 disengages from latch pin 72, allowing the latter to move outwardly and release the firing pin 69 so that subsequent deceleration of the projected assembly caused by tautening of arresting lines 46, causes firing pin 69 to overcome the spring biasing force and snap forwardly to strike the primer 68.

Deployment means 20 also comprises a plurality of radially disposed deployment projectiles 47 each suitably attached to one of suspension lines 43 at a point immediately adjacent to the periphery of parachute canopy 21. Each of deployment projectiles 47 is provided with a pin 47ª which, prior to actuation of the deployment powder charge, is disposed in a radially extending bore formed in casing means 64, all of said bores communicating with explosion chamber 65. Consequently, upon ignition and explosion of the deployment charge, projectiles 47 are projected radially outwardly from the axis of projectile tube 19 to thereby withdraw canopy 21 progressively from bag 22 and completely unfurl or deploy the canopy.

In this connection, the outer end of canopy bag 22 is made up of a plurality of overlapping tapes 22ª, each tape 22ª being secured at one end to the main body of bag 22 and being releasably attached to deployment means 20 at its other end in such fashion that firing of the deployment charge frees the ends of tapes 22ª and so opens bag 22 for ready removal of the parachute canopy. The canopy 21 is secured at its apex to the projectile tube 19, by means of lines 48 and retaining plate 49, in the manner described in my copending application Serial No. 718,362.

Advantageously, the canopy is folded in accordance with my copending application Serial No. 581,764, filed April 30, 1956, now Patent No. 2,936,138 and is therefore disposed within the bag 22 in the form of a stack of generally toroidal folds, so that progressive withdrawal of the canopy in the proper manner by action of the deployment projectiles is assured.

Upon completion of deployment of the canopy, the projectile tube 19, the deployment means 20 and the end cover cap 42 remain attached to the canopy at the apex thereof. Outer bag 22 and suspension line 23 of course remain on the projection means, retained there by plate 39. The canopy bag and the arresting lines depend from the straps 45.

It will be understood that, assemblies 16 and 17 being identical, both of the parachute canopies are simultaneously deployed in precisely the same manner, so that the canopies are disposed, with respect to the pilot, in the manner seen in FIG. 2, at a time which is, for practical purposes, substantially instantaneously after the pilot causes the ejection charge to explode. It is, of course, desirable to free the pilot from the ejection seat concurrently with projection and deployment of the canopies and this is accomplished simply by providing the seat belt 12 with an automatic release, constructed in any suitable fashion, actuated simultaneously with control wire 37.

Housing 18, FIGS. 5 and 6, comprises a base portion 50, FIG. 6, and a top portion 51, FIG. 5. Base portion 50 is provided with side walls 52, a lower end wall 53 and an upper end wall 54. The upper end wall 54 is provided with a circular positioning opening, indicated at 55, adapted to snugly receive a boss 56 formed integrally on casing member 25.

A mounting partition 57 is employed to rigidly secure casing member 25 in housing 18 and is provided with an opening through which arm 28 of casing member 25 extends. Partition 57 is secured to casing member 25, as by nut 58.

Side walls 50 are each provided with a notch at 59, the notches being disposed to accommodate the arms 26 and 27 of casing member 25. With partition 57 secured to casing member as described, and with cover 18 removed, the casing member 25 is placed in the position seen in FIG. 6, with boss 56 engaged in the positioning opening 55. Partition 57 is then secured to side walls 52 by means of sheet metal screws or other conventional fastening elements 60. Cover 18 is then applied and secured in place in any suitable fashion.

Side walls 50 are provided with peripheral flanges, indicated at 61, and the assembly is secured to the back surface of ejection seat 10 by fastening means 62 extending through suitable openings in flanges 61. Hence, the entire parachute assembly is mounted rigidly in place and so can be properly oriented with respect to the direction of movement of the ejection seat to be attained by the stabilizing parachute 13.

I claim:

1. In a parachute system, the combination of a pair of parachute assemblies each comprising an elongated projectile, a parachute canopy disposed in folded relation on and carried by said projectile, an explosively powered deployment means carried by said projectile and including a plurality of deployment projectiles connected to said canopy, and automatic means for actuating said deployment means; projection means comprising a pair of projection tubes arranged in opposition to each other, a combustion chamber, both of said tubes communicating with said combustion chamber, an explosive projection charge operatively associated with said combustion chamber, and means for exploding said charge, said projectiles of said pair of parachute assemblies each being telescopically engaged with a different one of said projection tubes, explosion of said explosive projection charge causing said parachute assemblies to be simultaneously projected in opposite directions.

2. In combination with an aircraft ejection seat having means for stabilizing the same as to attitude with respect to its direction of travel after ejection, a parachute system comprising a pair of parachute assemblies each including an elongated projectile, a parachute canopy disposed in folded relation on and carried by said projectile, an explosively powered deployment means carried by said projectile and including a plurality of deployment projectiles connected to said canopy, and means for actuating said deployment means; projection means comprising a pair of projection tubes arranged in opposition to each other, a combustion chamber, both of said tubes communicating with said combustion chamber, an explosive projection charge operatively associated with said combustion chamber, and means for exploding said charge, said projectiles of said parachute asemblies each being telescopically engaged with a different one of said projection tubes, explosion of said projection charge causing said parachute assemblies to be simultaneously projected in opposite directions; and means mounting said projection means on said seat with said projection tubes aligned generally transversely with respect to the direction of travel of the seat when the seat is stabilized in its normal attitude.

3. In an aerial recovery system for a load travelling at a relatively high velocity in a predetermined attitude with respect to its direction of travel, the combination of a pair of parachute assemblies each comprising a supporting projectile, a canopy disposed on said projectile in folded relation, explosively powered means carried by said projectile and operatively connected to said canopy for abruptly deploying said canopy, and deployment initiating means for actuating said explosively powered means; projection means comprising a pair of opposed projection tubes, a combustion chamber, both of said tubes communicating with said chamber, an explosive projection charge operatively associated with said combustion chamber, and means for exploding said projection charge to cause said parachute assemblies to be projected simultaneously in opposite directions; means mounting said projection means with said projection tubes extending generally transversely of the direction of travel of the load, and means for operating said deployment initiating means simultaneously at a time subsequent to explosion of said projection charge.

4. In an apparatus for recovering a load in air when the load is moving in a predictable direction at a relatively high speed at which conventional parachute apparatus are not dependably operable, the combination of a pair of parachute canopies disposed in folded relation, a pair of explosively operated deployment devices each operatively associated with a different one of said canopies, explosively operated projecting means operative to project said canopies simultaneously in opposite directions, means mounting said projecting means in connection with the load in such fashion that the projecting means will act to project said canopies substantially along a line extending transversely of the direction of travel of the load, means operatively connected with said deployment devices and effective to actuate the same simultaneously at a predetermined time after such projection occurs, and suspension line means connecting both of said canopies to the load.

5. In combination with an aerial load having means operatively connected for stabilizing the same in a given attitude with respect to the direction of travel of the load, a parachute system comprising a pair of parachute assemblies each comprising an elongated projectile, a parachute canopy disposed in folded relation on and carried by said projectile, and explosively powered means carried by said projectile for deploying said canopy; and projection means mounted on the load and operatively connected to said projectiles for simultaneously projecting said parachute assemblies in opposite directions generally transverse to the direction of travel of the load when the load is stabilized in said given attitude.

References Cited in the file of this patent

UNITED STATES PATENTS

| | | |
|---|---|---|
| 1,081,137 | Von Augezd | Dec. 9, 1913 |
| 1,251,896 | Krogel | Jan. 1, 1918 |
| 1,856,397 | Motter | May 3, 1932 |
| 2,352,721 | Krahel | July 4, 1944 |
| 2,478,758 | Frieder et al. | Aug. 9, 1949 |

FOREIGN PATENTS

| | | |
|---|---|---|
| 436,529 | France | Jan. 25, 1912 |
| 16,745 | France | Jan. 30, 1913 |